April 13, 1926.
J. SCHURCH
1,580,861
VENTILATING MEANS FOR DYNAMO ELECTRIC MACHINERY
Filed April 24, 1922
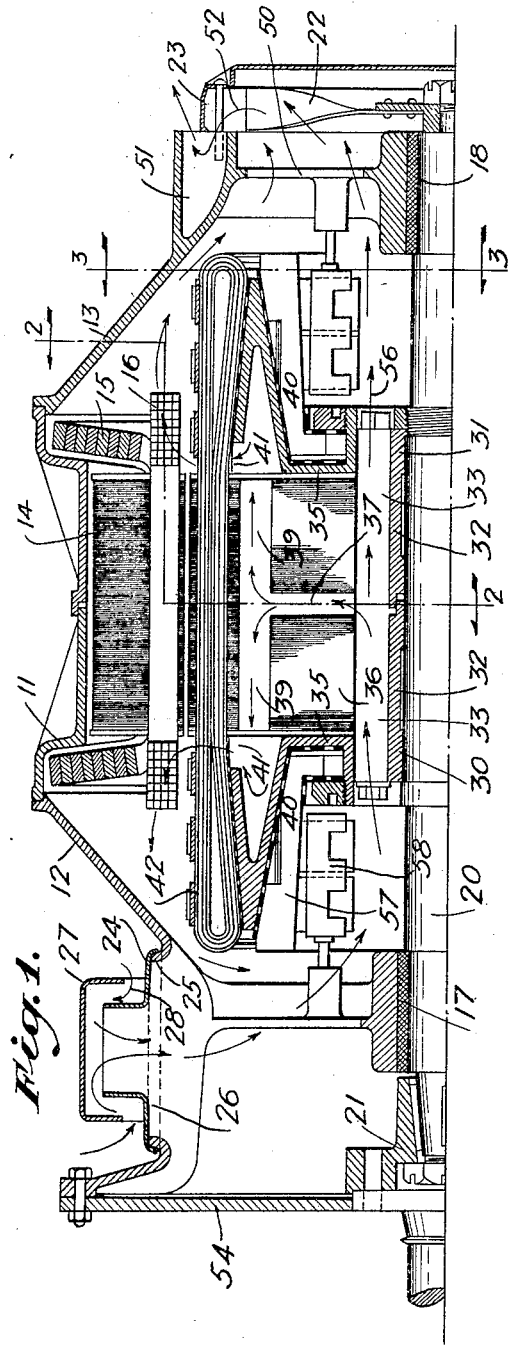
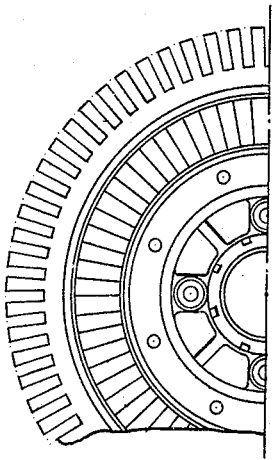
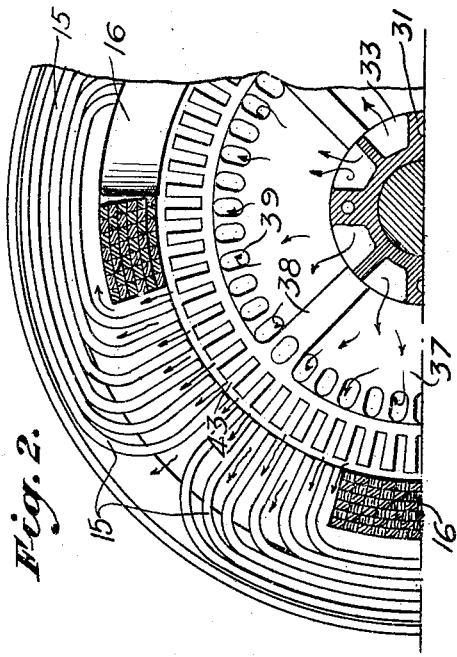
INVENTOR:
JACOB SCHURCH,
BY
ATTORNEYS.

Patented Apr. 13, 1926.

1,580,861

UNITED STATES PATENT OFFICE.

JACOB SCHURCH, OF LOS ANGELES, CALIFORNIA, ASSIGNOR OF ONE-HALF TO
WILLIAM H. HEISE, OF LOS ANGELES, CALIFORNIA.

VENTILATING MEANS FOR DYNAMO-ELECTRIC MACHINERY.

Application filed April 24, 1922. Serial No. 556,174.

*To all whom it may concern:*

Be it known that I, JACOB SCHURCH, a citizen of the United States, residing at Los Angeles, in the county of Los Angeles and State of California, have invented a new and useful Improvement in Ventilating Means for Dynamo-Electric Machinery, of which the following is a specification.

My invention relates to dynamo electric machinery and is particularly applicable to a generator adapted to be driven by an internal combustion engine and applied to an automobile or other vehicle.

The principal object of my invention is to provide ventilating means for any type of rotating dynamo electric machine.

Referring to the drawings, which are for illustrative purposes only:

Fig. 1 is a cross section through the upper half of one embodiment of my invention.

Fig. 2 is a section on a plane indicated by the line 2—2 in Fig. 1.

Fig. 3 is a section on a plane, indicated by line 3—3 of Fig. 1, the windings being omitted for the sake of clearance.

In the form of my invention illustrated in the drawings, 11 is a frame fitted with housing 12 and 13. Carried in the frame 11 are field punchings 14 supported field windings 15 and 16. Rotating in bearings 17 and 18 secured in the housing 12 and 13 respectively, is an armature shaft 20 which may be connected by means of coupling 21 with any suitable driving means. Carried on one end of the shaft 20, is a propeller fan 22, which is covered by a sheet metal housing 23. A cover 24 is secured on a lip 25, about an opening 26 in the housing 12, this cover 24 being partially covered by a hood 27, the hood being sufficiently raised to allow air to pass in the direction of the arrow 28 into the interior of the housing 12.

Fitting tightly on the shaft 20 are armature end bells 30 and 31, these end bells each being furnished with a sleeve portion 32, having ventilating ducts 33 therein. Carried between flanges 35 formed on the end bells 30 and 31 are a series of armature punchings 36. The central portion of the center punchings 36 is cut out, as shown, at 37 to provide a radial duct, bridges 38 being left to form spokes supporting the cut-out punchings. The punchings on either side of space 37 are provided with ducts 39 which communicate with spaces 40 formed inside the end bells, these spaces 40 having outlet openings 41 through which air is forced through armature windings 42 carried in slots 43 formed in the punchings 36. Commutators and brush-holders 57 and 58 are provided in accordance with standard practice.

The method of operation of my invention is as follows

Upon the shaft 20 being rotated, the fan 22 draws air through an opening 50 in the housing 13, forcing this air radially outward through a cavity 51 formed in the housing 13, in the direction of the arrow 52. This creates a partial vacuum inside the housing 13 and ventilating air is drawn through the machine as follows: Since the interior of the machine is under partial vacuum, the external pressure is sufficient to force air under the hood 27 and through the opening 26 in the direction of the arrow 28. The end of the housing 12 is closed by a plate 54, which forms a portion of the driving means not shown. The air under pressure is forced toward the shaft 20 and into the ducts 33, a small portion of the air tending to pass directly through these ducts in the direction of the arrow 56. The arms or spokes 38 act, however, as a centrifugal fan tending to draw air from the ducts 33 and force it in a radial direction through the openings 37, this air dividing and passing through the openings 39 into the spaces 40 from which the air is passed through the openings 41 and through the armature windings 42 and between the field windings 15 and 16, thus cooling both windings. A portion of this air is drawn out of the housing by the fan 22, and a portion passes backwardly from the left-hand end of the armature, shown in Fig. 1, being again drawn into the duct 33.

I wish to call particular attention to the slots 39, which are directly below and parallel to the slots 43. It is common practice in armature construction to provide radial air ducts for cooling purposes. These radial air ducts, when applied to an armature, are not highly efficient in cooling the punchings and the coils of the armature, for the reason that although they cool the punchings on either side of the radial openings, they cannot cool any great distance in axial direction, due to the poor heat transfer in this direction. The armature punchings are ordinarily built up of laminated steel, separated by paper or enamel. The paper or enamel is a poor heat conductor, as is also the oxidized scale found on steel punchings. Any heat transfer through these punchings in an axial direction is, therefore, very effective. By passing a current of cool air through the ducts 39, in an axial direction, I obviate the necessity for any heat transfer in an axial direction, the heat from the teeth between the slots 43 and from the bottom of these slots being transmitted through a very short distance in a radial direction to the current of air in the ducts 39. This radial heat transfer being wholly in the body of the metal, is very effective and the distance being short, I am able to provide very effective cooling with a corresponding decrease in weight and increase in efficiency of the machine.

I claim as my invention:

1. In a dynamo, the combination of: a frame; field cores; field coils; a shaft journaled in said frame; a propeller fan mounted on an end portion of said shaft and rotatable by said shaft to provide a forced draft for the dynamo; a housing at each side of said frame, one of said housings having an air inlet; a hood for said air inlet; a laminated armature core having slot therein extending parallel to the axis of said armature core; electric conductors in said slots; said core having ventilating ducts formed therein parallel to said slots and disposed between said slots and the axis of said armature core, said ventilating ducts being open at opposite ends and comprising two concentric series, said core having radial ducts communicating with said series of ventilating ducts, said core comprising spokes adapted to act as fans; means on either end of said armature core for supporting the connecting limbs of said conductors, said means being so formed that the air from the ducts is forced radially outward between said conductors and adjacent the ends of said core and said field coils.

2. In a dynamo electric machine, the combination of: a housing; an air inlet at one end and an air outlet at the other end; field elements carried by said housing; a rotor provided with a shaft journaled in the housing; and an exhaust fan driven by the rotor to circulate air through the housing, said rotor having a first series of longitudinal ventilation ducts open at opposite ends and circularly disposed around and adjacent to said shaft, a second series of longitudinal ventilation ducts open at opposite ends and circularly disposed between said first series and the periphery of the rotor, and radial ducts connecting the medial portion of the longitudinal ducts of both series, whereby air will be entrained forwardly through said first series of ducts to cool the shaft and adjacent portions of the rotor, a portion of the air entering said first series of ducts being entrained through the radial ducts and divided to discharge forwardly and rearwardly from the second series of ducts, to uniformly cool the outer portion of the rotor, and the housing being formed to direct air discharging rearwardly from said second series of ducts to combine with the air entering the housing, to maintain a substantially uniform temperature within both end portions of the housing.

In testimony whereof, I have hereunto set my hand at Los Angeles, California, this 18th day of April, 1922.

JACOB SCHURCH.